US008122449B2

(12) United States Patent
Berman et al.

(10) Patent No.: US 8,122,449 B2
(45) Date of Patent: Feb. 21, 2012

(54) DETERMINING WHETHER TO RETAIN OR TERMINATE A THREAD BASED ON A MINIMUM NUMBER OF THREADS IN A THREAD POOL AND A MAXIMUM NUMBER OF THREADS ALLOWED WAITING ON THE CHANNEL

(75) Inventors: Steven M. Berman, Pittsburgh, PA (US); Thirumale Niranjan, Bangalore (IN); Michael Wayne Young, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 1170 days.

(21) Appl. No.: 11/852,039

(22) Filed: Sep. 7, 2007

(65) Prior Publication Data

US 2009/0070766 A1    Mar. 12, 2009

(51) Int. Cl.
G06F 9/46 (2006.01)
G06F 15/16 (2006.01)
(52) U.S. Cl. .................. 718/102; 709/235; 718/104
(58) Field of Classification Search .................. None
See application file for complete search history.

(56) References Cited

U.S. PATENT DOCUMENTS

| 5,991,792 | A * | 11/1999 | Nageswaran | 718/102 |
|---|---|---|---|---|
| 6,182,109 | B1 * | 1/2001 | Sharma et al. | 718/104 |
| 6,745,212 | B2 | 6/2004 | Kishi et al. | |
| 6,823,515 | B2 | 11/2004 | LiVecchi | |
| 6,941,379 | B1 * | 9/2005 | Dingsor et al. | 709/235 |
| 6,990,665 | B2 | 1/2006 | Ballantyne | |
| 2003/0149716 | A1 | 8/2003 | Peterson | |
| 2004/0187120 | A1 | 9/2004 | Moore et al. | |
| 2004/0216113 | A1 | 10/2004 | Armstrong et al. | |
| 2006/0095908 | A1 | 5/2006 | Norton et al. | |

* cited by examiner

*Primary Examiner* — Jennifer To
*Assistant Examiner* — Bing Zhao
(74) *Attorney, Agent, or Firm* — Janaki K. Davda; Konrad Raynes & Victor LLP

(57) ABSTRACT

Provided are techniques for workload balancing. A message is received on a channel. A thread in a thread pool is selected to process the message. In response to determining that the message has been processed and a response has been sent on the channel by the thread, it is determined whether a total number of threads in the thread pool is greater than a low water mark plus one and whether the channel has more than a maximum number of threads blocked on a receive, wherein the low water mark represents a minimum number of threads in the thread pool. In response to determining that a number of threads in the thread pool is greater than the low water mark plus one and that the channel has more than the maximum number of threads blocked on a receive, the thread is terminated. In response to determining at least one of the number of threads in the thread pool is less than or equal to the low water mark plus one and the channel has less than or equal to the maximum number of threads blocked on a receive, the thread is retained.

21 Claims, 6 Drawing Sheets

DETERMINING WHETHER TO RETAIN OR TERMINATE A THREAD BASED ON A MINIMUM NUMBER OF THREADS IN A THREAD POOL AND A MAXIMUM NUMBER OF THREADS ALLOWED WAITING ON THE CHANNEL

BACKGROUND

1. Field

Embodiments of the invention relate to dynamic workload balancing in a thread pool.

2. Description of the Related Art

In a virtual tape storage system, a computer with hard disk drive storage and an automated tape library is used to emulate tape drives and tape cartridges. In this way, host systems performing Input/Output (I/O) operations to tape are in fact performing I/O operations to a computer with a set of hard disk drives emulating the tape storage.

A Virtual Tape Server (VTS) receives and processes I/O operations from the host systems. In some situations, components (e.g., hardware or software) within the VTS or components at different VTSs need to communicate using messages. The messages are processed by the receiving component using a plurality of threads of execution. Threads may be described as a sequence of instructions that execute independently and in parallel to perform services or functions. Threads may be said to be formed when a program splits itself into two or more simultaneously (or quasi-simultaneously) running tasks which share the memory and processor resources of the parent process. Each component may maintain a thread pool (i.e., a collection of threads) and assign these threads to process requests.

There is a need in the art for dynamic workload balancing in such a thread pool.

SUMMARY OF EMBODIMENTS OF THE INVENTION

Provided are a method, computer program product, and system for workload balancing. A message is received on a channel. A thread in a thread pool is selected to process the message. In response to determining that the message has been processed and a response has been sent on the channel by the thread, it is determined whether a total number of threads in the thread pool is greater than a low water mark plus one and whether the channel has more than a maximum number of threads blocked on a receive, wherein the low water mark represents a minimum number of threads in the thread pool. In response to determining that a number of threads in the thread pool is greater than the low water mark plus one and that the channel has more than the maximum number of threads blocked on a receive, the thread is terminated. In response to determining at least one of the number of threads in the thread pool is less than or equal to the low water mark plus one and the channel has less than or equal to the maximum number of threads blocked on a receive, the thread is retained.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
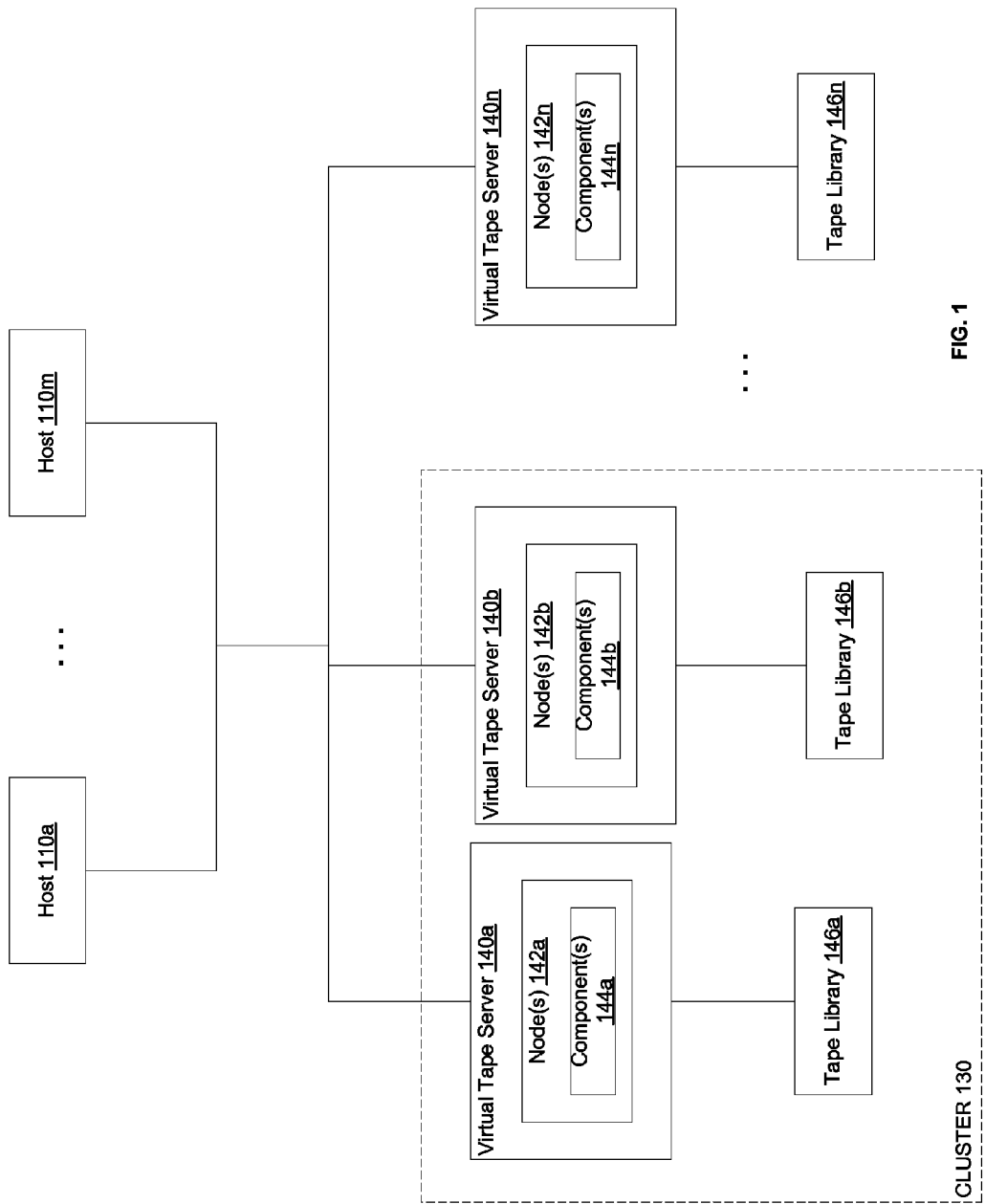
FIG. 1 illustrates a computing environment including distributed Virtual Tape Servers (VTSs) in accordance with certain embodiments.

FIG. 1 illustrates a computing environment including distributed Virtual Tape Servers (VTSs) in accordance with certain embodiments. Hosts 110a . . . 110m (where the suffixes "a" and "m" and the ellipses are used to indicate that there are multiple hosts (two or more)) which are coupled to VTSs 140a, 140b, . . . 140n (where the suffixes "a", "b", and "n" and the ellipses are used to indicate that there are multiple VTSs (two or more)). Although multiple hosts 110a . . . 110m are illustrated, in certain embodiments, a single host is coupled to the VTSs 140a, 140b . . . 140n.

Two or more VTSs (e.g., 140a, 140b) may be pooled together to form a cluster 130. Each VTS 140a, 140b, . . . 140n is coupled to a tape library 146a, 146b, . . . 146n that houses tape cartridges residing in shelves and which may be loaded into tape drives for access by a VTS 140a, 140b, . . . 140n.

Each VTS 140a, 140b, . . . 140n includes one or more nodes 142a, 142b, . . . 142n (e.g., computing devices). Each node 142a, 142b, . . . 142n includes one or more components 144a, 144b, 144n. In certain embodiments, each VTS 140a, 140b, . . . 140n includes a general node (a "gnode") that receives requests (i.e., I/O operations) from hosts 110a . . . 110m, works on the requests by issuing commands to the tape library 146a, 146b, . . . 146n, and responds to the requests (e.g., by returning data to the host 110a . . . 110m that issued the request). In certain embodiments, each VTS 140a, 140b, . . . 140n includes a virtual tape node ("vnode") and a hierarchical node ("hnode"), with the vnode receiving requests (i.e., I/O operations) from hosts 110a . . . 110m and responding to the requests (e.g., by returning data to the host 110a . . . 110m that issued the request) and with the hnode working on the requests by issuing commands to the tape library 146a, 146b, . . . 146n. The vnode and hnode work together to process host requests by passing messages (e.g., requests to perform some processing) to each other. In certain embodiments, a message identifies a particular cluster 130, a particular VTS 140a, 140b, . . . 140n, a particular node 142a, 142b, . . . 140n, and a particular component 144a, 144b, . . . 144n to which the message is to be routed.

In this manner, messages flow between components 144a, 144b, . . . 144n on the same VTS 140a, 140b . . . 140n or on different VTSs 140a, 140b, . . . 140n within the same cluster 130, or in different clusters.

Each of these messages indicates a unit of work. Each component can create a plurality of messaging interfaces known as channels. When messages arrive on a channel interface of a component 144a, 144b, . . . 144n, the messages are placed in a message queue to await processing. When a server component commences work on processing work from a channel, each message is picked up and processed by a thread from a thread pool.

Figure 2:
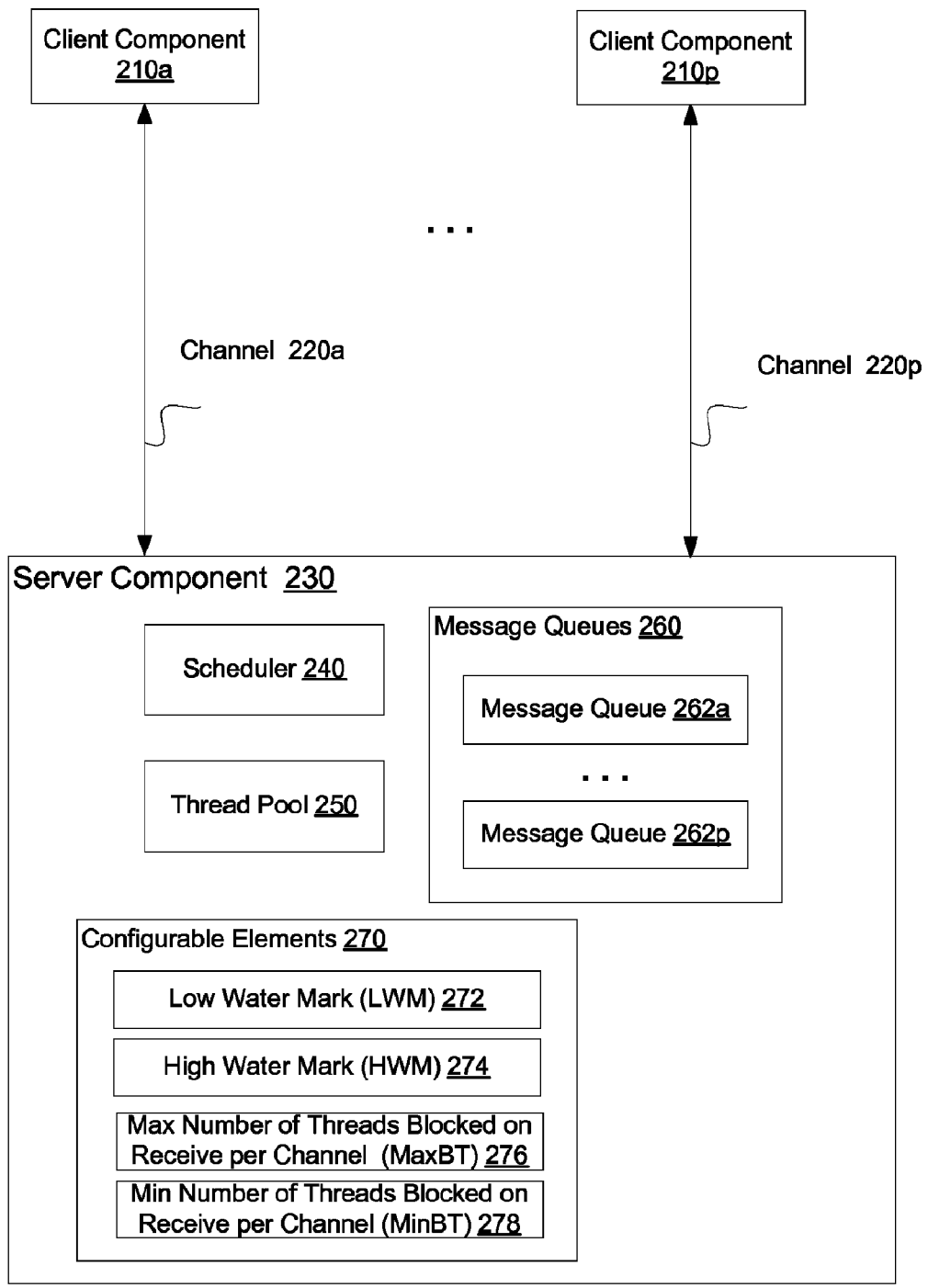
FIG. 2 illustrates details of a component in accordance with certain embodiments.

FIG. 2 illustrates some details of a component 230 in accordance with certain embodiments. Client components 210a . . . 210p (where the suffixes "a" and "p" and the ellipses are used to indicate that there are multiple client components (two or more)) and server component 230 are examples of components 144a, 144b, . . . 144n. Each component 144a, 144b, . . . 144n may act as a client component that issues messages or as a server component that processes messages. Thus, each component 144a, 144b, . . . 144n may embody elements of both a client and a server component 210a . . . 210p, 230.

The client components 210a . . . 210p issue messages to the server component 230 on different channels 220a . . . 220p, respectively.

The server component 230 includes a scheduler 240, a thread pool 250, message queues 260, and configurable elements 270 (i.e., elements whose values may be changed or "configured").

With embodiments, the thread pool 250 includes one or more threads that are used as potential "listeners" to pick up messages and "workers" to process the messages. Embodiments optimize the scheduling of these threads across the various channels 220a . . . 220p and units of work indicated by the messages. In certain embodiments, each channel 220a . . . 220p (where the suffixes "a" and "p" and the ellipses are used to indicate that there are multiple client components (two or more)) is associated with a message queue 262a . . . 262p.

Thus, a server component 230 that receives and acts on a message has a thread pool 250 that is used to service the incoming messages from the client components 210a . . . 210p and to send response messages back to the client components 210a . . . 210p on their respective channels 220a . . . 220p. In certain embodiments, communication channels can be implemented via message queues 260 (e.g., Websphere® message queues, WebSphere is a trademark or registered trademark of IBM Corporation in the United States, other countries, or both). That is, a message queue 262a . . . 262p is associated with a particular channel 220a . . . 220p, and so a message from a particular channel 220a . . . 220p is queued on the associated message queue 262a . . . 262p. In other embodiments, communication channels can be implemented using any other technique known in the art.

Each thread is directed by the scheduler 240 to select the channel 220a . . . 220p that the thread will listen to, and thus, the thread pool acts autonomically. The server component 230 includes configurable elements 270 (e.g., set by a system administrator) that include: a low water mark (LWM) 272, a high water mark (HWM) 274, a max number of threads blocked on receive per channel (MaxBT) 276, and a min number of threads blocked on receive per channel (MinBT) 278. LWM represents the long term minimum number of threads in the thread pool 250. With the LWM, once the thread pool 250 increases beyond LWM, the thread pool 250 will keep its size above this quantity. HWM represents the maximum number of threads in the thread pool 250. MaxBT represents the maximum number of threads that can be blocked waiting for new messages to arrive on a queue (i.e., blocked on a receive). MinBT represents the minimum number of threads that are to be blocked on a receive from any one channel.

Figure 3A:
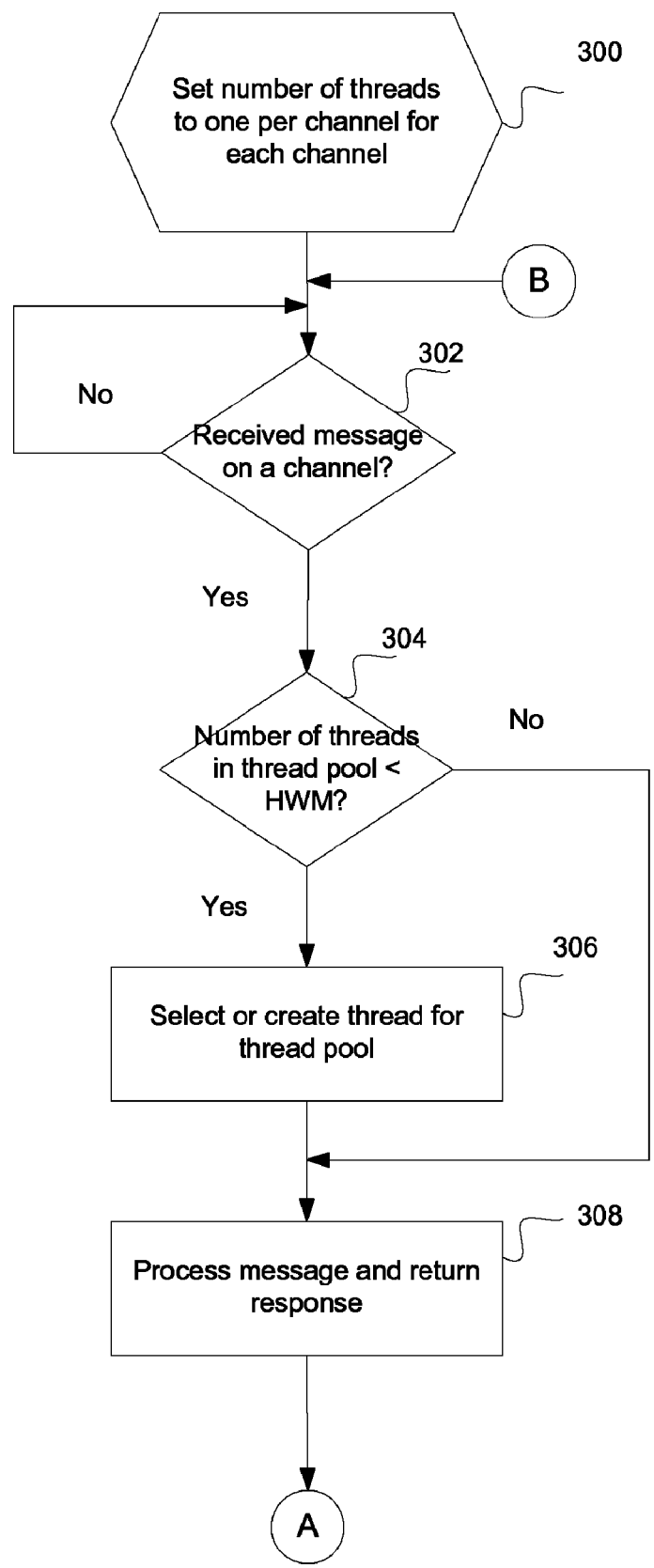
FIGS. 3A and 3B illustrate logic performed for thread pool size management in accordance with certain embodiments.
Figure 3B:
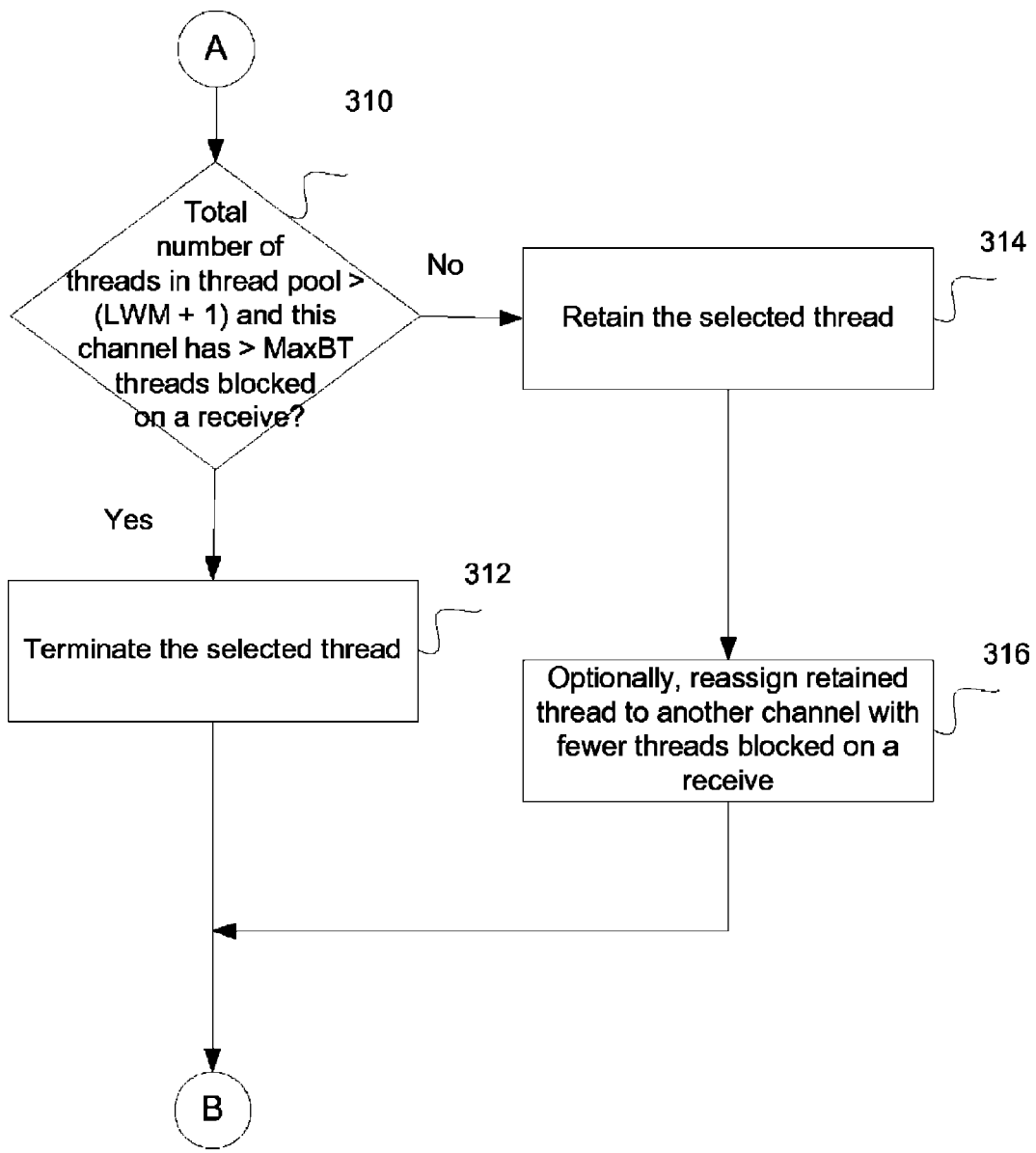

FIGS. 3A and 3B illustrate logic performed for thread pool size management in accordance with certain embodiments. In FIG. 3A, control begins at block 300 with the scheduler 240 setting a number of threads to one per channel for each channel 220a . . . 220p. In block 302, the scheduler 240 determines whether a message has been received on a channel 220a . . . 220p. If so, processing continues to block 304, otherwise, processing loops back to 302 (i.e., the scheduler 240 is waiting for a message).

In block 304, the scheduler 240 determines whether the number of threads in the thread pool 250 is less than the high water mark (HWM). If so, processing continues to block 306, otherwise, processing continues to block 308. In block 306, the scheduler 240 selects or creates a thread for the thread pool 250 based on a number of threads in the thread pool and a high water mark for the thread pool. In certain embodiments, selecting the thread includes creating a new thread and selecting this new thread. In certain embodiments, the new thread is created in response to determining that the number of threads in the thread pool are less than the high water mark and no idle threads are available in the pool. In block 308, a thread from the thread pool 250 processes the message and returns a response to the component 210a . . . 210p that issued the message. From block 308 (FIG. 3A), processing continues to block 310 (FIG. 3B).

In block 310, the scheduler determines whether the total number of threads in the thread pool 250 is greater than the low water mark plus one (LWM+1) and whether this channel 210a . . . 210p has more than the MaxBT number of threads blocked on a receive. If so, processing continues to block 312, otherwise, processing continues to block 314.

In block 312, the scheduler 240 terminates the selected thread. In block 314, the scheduler 240 retains the selected thread. In block 316, the scheduler optionally determines whether to reassign the retained thread to another channel with fewer threads blocked on a receive.

Thus, in certain embodiments, the number of threads starts at one per channel 210a . . . 210p. As messages come in, more threads are created, as long as the number of threads in the thread pool 250 is less than the high water mark 274. After messages are handled and responses sent back, there is an opportunity to see whether the thread should be retained or terminated. In some embodiments, threads are retained to avoid the costs of thread termination and subsequent creation of a new thread. In some embodiments, the thread is terminated when the number of threads in the thread pool 250 is above LWM+1 (first condition) and this channel has too many threads (i.e., more than MaxBT threads) blocked on a receive (second condition). The first condition implies that there is a certain critical mass of threads, and the second condition implies that there are too many threads idle on this channel or that this channel is not very busy.

In certain embodiments, threads may be terminated if the client component 210a. . . 210p connected to the channel 220a . . . 220p malfunctions or closes the channel.

There is a moderate cost involved in keeping a thread around when it's not required and there is a cost involved in creating and destroying threads. Embodiments balance these two factors.

The logic of FIGS. 3A and 3B ensures that the number of threads stays between LWM and HWM, once it grows above LWM, and adapts to current conditions. For example, if the server component 230 is very busy with a lot of concurrent messages, the number of threads will grow quickly to HWM. As another example, if the server component 230 then becomes slightly less busy, the threads are not terminated, thus keeping a reserve of threads available in the thread pool 250 to service a burst of incoming messages. Also, if the load decreases drastically, some threads are terminated so that resources (e.g., for maintaining the threads) are not unnecessarily consumed. In certain embodiments, a high setting for MaxBT favors threads being retained, while a low MaxBT is more sensitive to work load variations.

In certain embodiments, each thread in the thread pool 240 goes and listens to the channel 220a ... 220p and pulls work for itself. This is in contrast to other workload management models in which there is a listener thread which pulls work and hands it off to a worker thread. Having each thread pull work for itself is appropriate especially because the communication paradigm is message queuing and not directly based on sockets, streams, or similar low level communications mechanisms.

Figure 4:
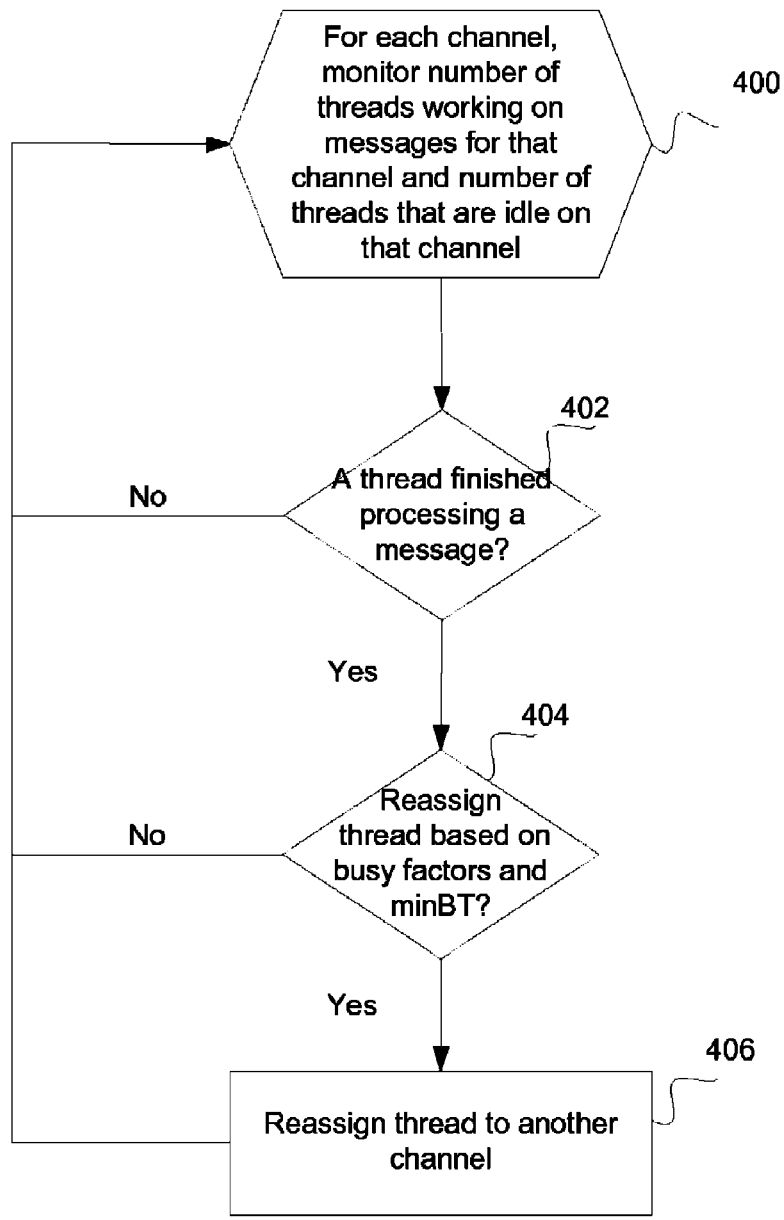
FIG. 4 illustrates logic for thread pool scheduling in accordance with certain embodiments.

FIG. 4 illustrates logic for thread pool scheduling in accordance with certain embodiments. Control begins at block 400 with the scheduler 240, for each channel, monitoring the number of threads working on messages for that channel and the number of threads that are idle on that channel. In block 402, the scheduler 240 determines whether a thread finished processing a message. If so, processing continues to block 404, otherwise, processing loops back to block 400. In block 404, the scheduler 240 determines whether to reassign the thread based on busy factors and the value of minBT. A busy factor may be described as an indication of how busy a particular channel is. If so, processing continues to block 406, otherwise, processing loops back to block 400. In block 406, the scheduler 240 reassigns the thread to another channel.

Thus, threads in the thread pool 250 are scheduled to channels. The threads are responsible for receiving messages on a channel, working on messages that were received, and sending back responses on that channel. For each channel, the scheduler 240 monitors the number of threads working on messages from that channel, as well as the number of threads that are idle (on a receive) on that channel. The scheduler 240 takes these factors and schedules the thread to the busiest channel that needs threads.

For example, a busy factor may be computed by: (#busy threads/#idle threads). If channel-1 has 5 idle threads and 10 busy threads, the busy factor is 2; if channel-2 has 10 idle threads and 50 busy threads, the busy factor is 5. The scheduler 240 schedules the next thread that completes its work to channel-2.

In certain embodiments, each time a thread finishes a round of receive, work and respond, the thread is eligible for reassignment to a different channel.

As a result of the logic of FIG. 4, busy channels get more threads and, therefore, the response time and throughput for messages is improved. Also, not-so-busy channels are not starved by a few busy channels because a MinBT number of threads is maintained for every channel (i.e., every channel has a lower bound on the number of threads assigned to that channel). If one client component 210a ... 210p is extremely busy, channels 220a ... 220p associated with less busy client components 210a ... 210 start shedding their threads to the busy channel 220a ... 220p up to a point. By setting MinBT appropriately in relation to the HWM and the number of channels, the request processing behavior of the server component 230 can be tuned. In certain embodiments, a low MinBT helps installations in which certain channels 220a ... 220p are always busy and certain channels 220a ... 220p are not, i.e., in less dynamically changing conditions and workloads. In certain embodiments, a high MinBT is useful for dynamically changing conditions. However, the cost of a high MinBT is that a lesser number of threads will be available to the very busy channels 220a ... 220p, which may affect aggregate response time and throughput.

Thus, embodiments provide dynamic provisioning of threads to match workload conditions as well as workload balancing across channels that incorporates ideas of fairness and responsiveness. Moreover, threads are scheduled according to a measure of a work-unit load instead of per connection.

Embodiments provide a distributed VTS with thread pools that are fair and balanced (i.e., each peer gets a fair share of the resources); that are efficient and do not consume resources heavily when not required; that are dynamic and react quickly to changes in load; and that are self-managing and self-scheduling. Thus, embodiments provide a comprehensive solution to dynamic workload balancing in a thread pool.

ADDITIONAL EMBODIMENT DETAILS

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and digital video disk DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 3A, 3B, and 4 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3A, 3B, and 4 may be implemented in software, hardware, programmable and non-programmable gate array logic or in some combination of hardware, software, or gate array logic.

Figure 5:
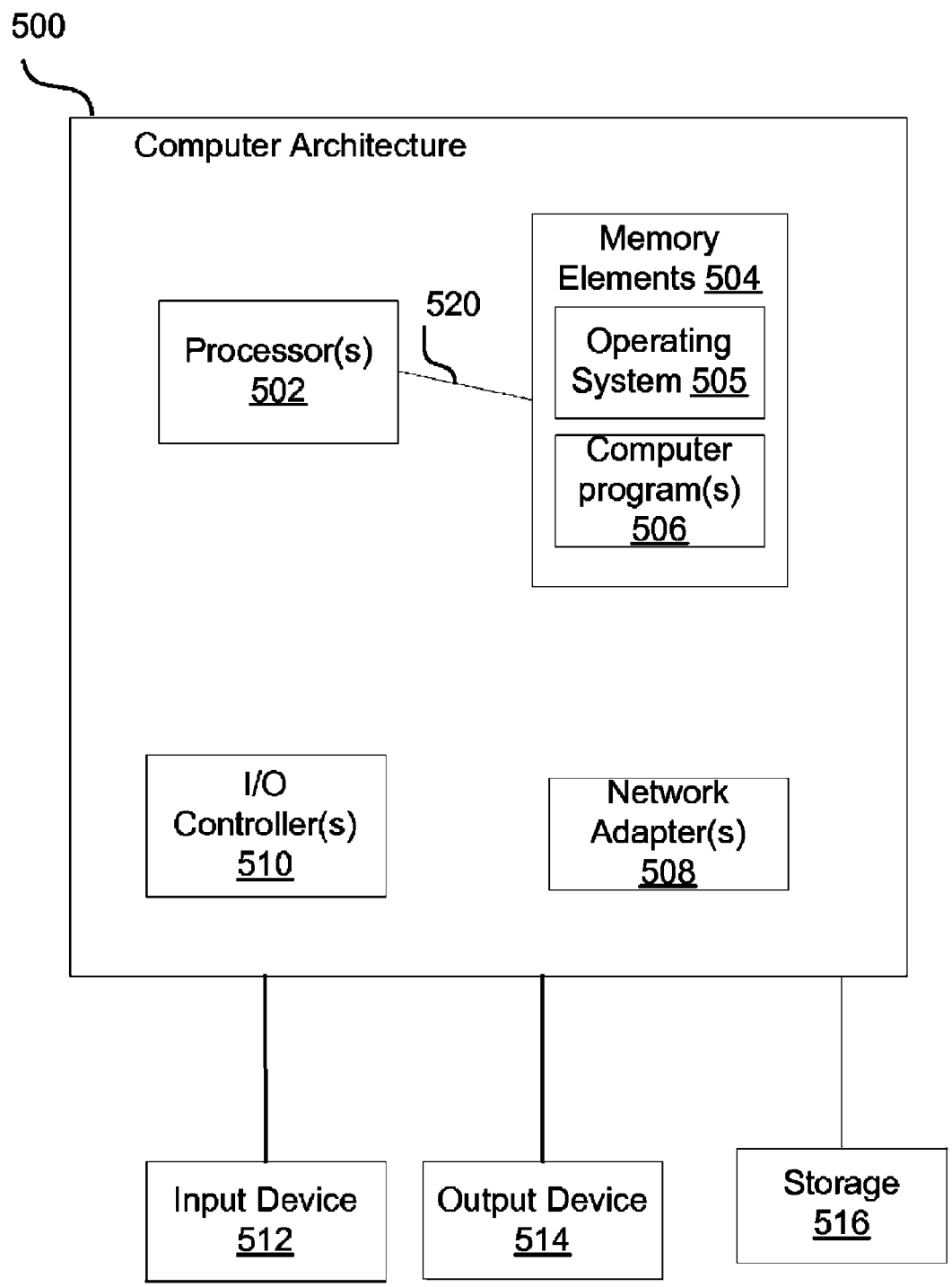
FIG. 5 illustrates a system architecture that may be used in accordance with certain embodiments.

FIG. 5 illustrates a system architecture 500 that may be used in accordance with certain embodiments. Hosts 110a ... 110m, Virtual Tape Servers (VTSs) 140a, 140b, ... 140n, nodes 142a, 142b, ... 142n may each implement system architecture 500. The system architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The system architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The system architecture 500 may include fewer components than illustrated, additional components not illustrated herein, or some combination of the components illustrated and additional components. The system architecture 500 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for workload balancing, comprising:

receiving a value for a low water mark, wherein the low water mark represents a minimum number of threads in a thread pool;

for each of one or more channels that are serviced by the threads in the thread pool, receiving a value, wherein the value represents a maximum number of threads that are allowed to be waiting for messages to arrive on the channel;

receiving a message on a channel of the one or more channels;

selecting a thread in the thread pool to process the message, wherein the thread is assigned to the channel to process the message for the channel;

in response to determining that the message has been processed and a response has been sent on the channel by the thread, determining whether a total number of threads in the thread pool is greater than the value of the low water mark plus one and whether the channel has more than the value of the maximum number of threads;

in response to determining that the total number of threads in the thread pool is greater than the value of the low water mark plus one and that the channel has more than the value of the maximum number of threads terminate the thread from the thread pool; and in response to determining at least one of the total number of threads in the thread pool is less than or equal to the value of the low water mark plus one and the channel has less than or equal to the value of the maximum number of threads, retain the thread in the thread pool.

2. The method of claim 1, wherein selecting the thread comprises:

creating a new thread in the thread pool; and selecting the new thread.

3. The method of claim 2, further comprising:

receiving a value for a high water mark, wherein the high water mark represents a maximum number of threads in the thread pool; and after receiving the message, determining whether the number of threads in the thread pool are less than the value of the high water mark, and wherein the new thread is created in response to determining that the total number of threads in the thread pool are less than the high water mark and no idle threads are available in the pool.

4. The method of claim 1, further comprising:

assigning one thread in the thread pool to each of the one or more channels.

5. The method of claim 1, further comprising:

for each of the one or more channels, monitoring a number of threads that are working on messages for that channel and a number of threads that are idle on that channel.

6. The method of claim 5, further comprising:
after the thread has finished processing the message, determining whether to reassign the thread to another channel based on busy factors of each of the multiple channels and a minimum number of threads waiting for new messages to arrive on the channel on which the message was received, wherein the busy factor comprises an indication of how busy a particular channel is.

7. The method of claim 6, further comprising:
in response to determining that the thread is to be reassigned to another channel, reassigning the thread to another channel.

8. A computer program product comprising computer storage storing a computer readable program, wherein, the computer readable program, when executed by a processor on a computer, causes the computer to:
receive a value for a low water mark, wherein the low water mark represents a minimum number of threads in a thread pool;
for each of one or more channels that are serviced by the threads in the thread pool, receive a value, wherein the value represents a maximum number of threads that are allowed to be waiting for messages to arrive on the channel;
receive a message on a channel of the one or more channels;
select a thread in the thread pool, wherein the selected thread is assigned to the channel to process the message for the channel;
in response to determining that the message has been processed and a response has been sent on the channel by the thread, determine whether a total number of threads in the thread pool is greater than the value of the low water mark plus one and whether the channel has more than the value of the maximum number of threads;
in response to determining that the total number of threads in the thread pool is greater than the value of the low water mark plus one and that the channel has more than the value of the maximum number of threads, terminate the thread from the thread pool; and
in response to determining at least one of that the total number of threads in the thread pool is less than or equal to the value of the low water mark plus one and that the channel has less than or equal to the value of the maximum number of threads, retain the thread in the thread pool.

9. The computer program product of claim 8, wherein the computer readable program, when executed by the processor on the computer, causes the computer to:
create a new thread in the thread pool; and
select the new thread.

10. The computer program product of claim 9, wherein the computer readable program, when executed by the processor on the computer, causes the computer to:
receive a value for a high water mark, wherein the high water mark represents a maximum number of threads in the thread pool; and
after receiving the message, determine whether the number of threads in the thread pool are less than the value of the high water mark, and wherein the new thread is created in response to determining that the total number of threads in the thread pool are less than the high water mark and no idle threads are available in the pool.

11. The computer program product of claim 8, wherein the computer readable program, when executed by the processor on the computer, causes the computer to:
assign one thread in the thread pool to each of the one or more channels.

12. The computer program product of claim 8, wherein the computer readable program, when executed by the processor on the computer, causes the computer to:
for each of the one or more channels, monitor a number of threads working on messages for that channel and a number of threads that are idle on that channel.

13. The computer program product of claim 12, wherein the computer readable program, when executed by the processor on the computer, causes the computer to:
after the thread has finished processing the message, determine whether to reassign the thread to another channel based on busy factors of each of the multiple channels and a minimum number of threads waiting for new messages to arrive on the channel on which the message was received, wherein the busy factor comprises an indication of how busy a particular channel is.

14. The computer program product of claim 13, wherein the computer readable program, when executed by the processor on the computer, causes the computer to:
in response to determining that the thread is to be reassigned to another channel, reassign the thread to another channel.

15. A system for workload balancing, comprising:
a processor;
a storage device connected to the processor, wherein the storage device has stored thereon a program, and wherein the processor is configured to execute instructions of the program to perform operations, the operations comprising:
receiving a value for a low water mark, wherein the low water mark represents a minimum number of threads in a thread pool;
for each of one or more channels that are serviced by the threads in the thread pool, receiving a value, wherein the value represents a maximum number of threads that are allowed to be waiting for messages to arrive on the channel;
receiving a message on a channel of the one or more channels;
selecting a thread in the thread pool to process the message, wherein the selected thread is assigned to the channel to process the message for the channel;
in response to determining that the message has been processed and a response has been sent on the channel by the thread, determining whether a total number of threads in the thread pool is greater than the value of the low water mark plus one and whether the channel has more than the value of the maximum number of threads;
in response to determining that the total number of threads in the thread pool is greater than the value of the low water mark plus one and that the channel has more than the value of the maximum number of threads, terminating the thread from the thread pool; and
in response to determining at least one of that the total number of threads in the thread pool is less than or equal to the value of the low water mark plus one and that the channel has less than or equal to the value of the maximum number of threads, retaining the thread in the thread pool.

16. The system of claim 15, wherein the operations for selecting the thread further comprise:
   creating a new thread in the thread pool; and
   selecting the new thread.

17. The system of claim 16, wherein the operations further comprise:
   receiving a value for a high water mark, wherein the high water mark represents a maximum number of threads in the thread pool; and
   after receiving the message, determining whether the number of threads in the thread pool are less than the value of the high water mark, and wherein the new thread is created in response to determining that the total number of threads in the thread pool are less than the high water mark and no idle threads are available in the pool.

18. The system of claim 15, wherein the operations further comprise:
   assigning one thread in the thread pool to each of the one or more channels.

19. The system of claim 15, wherein the operations further comprise:
   for each of the one or more channels, monitoring a number of threads working on messages for that channel and a number of threads that are idle on that channel.

20. The system of claim 19, wherein the operations further comprise:
   after the thread has finished processing the message, determining whether to reassign the thread to another channel based on busy factors of each of the multiple channels and a minimum number of threads waiting for new messages to arrive on the channel on which the message was received, wherein the busy factor comprises an indication of how busy a particular channel is.

21. The system of claim 20, wherein the operations further comprise:
   in response to determining that the thread is to be reassigned to another channel, reassigning the thread to another channel.

\* \* \* \* \*